United States Patent [19]

Mentink et al.

[11] 4,349,721
[45] Sep. 14, 1982

[54] COATED WELDING ELECTRODE OF BASIC TYPE SUITABLE FOR VERTICAL DOWN WELDING OF PIPES

[75] Inventors: Henricus Mentink; Hendrikus van Rooijen, both of Utrecht, Netherlands

[73] Assignee: U.S. Philips Corporation, New York, N.Y.

[21] Appl. No.: 195,534

[22] Filed: Oct. 9, 1980

[30] Foreign Application Priority Data

Nov. 9, 1979 [NL]  Netherlands ............... 7908212

[51] Int. Cl.$^3$ ............................................. B23K 35/36
[52] U.S. Cl. ................................. 219/145.23; 148/26; 219/146.23; 219/146.24; 428/386
[58] Field of Search ................ 219/145.23, 146.23, 219/146.24; 148/26; 428/385, 386

[56] References Cited

U.S. PATENT DOCUMENTS

| | | | |
|---|---|---|---|
| 2,805,971 | 9/1957 | Bryan ............................. | 148/26 |
| 3,084,074 | 4/1963 | Wasserman ..................... | 428/386 X |
| 3,211,582 | 10/1965 | Wasserman ..................... | 148/26 X |
| 3,405,005 | 10/1968 | Feldmann ....................... | 148/26 X |
| 3,645,782 | 2/1972 | Johnson .......................... | 148/26 X |
| 3,849,189 | 11/1974 | Yaronvinsky ................... | 428/386 |
| 4,010,309 | 3/1977 | Petersen ......................... | 219/146.23 X |
| 4,017,339 | 4/1977 | Okuda ............................. | 148/26 X |
| 4,103,067 | 7/1978 | Jackson .......................... | 219/145.23 X |
| 4,251,711 | 2/1981 | Tanigaki ......................... | 219/145.23 X |

FOREIGN PATENT DOCUMENTS 1159838  7/1969  United Kingdom ........... 219/146.24

*Primary Examiner*—Richard R. Kucia
*Attorney, Agent, or Firm*—Thomas A. Briody; William J. Streeter; Rolf E. Schneider

[57] ABSTRACT

There is provided an improved basic coated welding rod for downhand welding of fixed pipes. The coating contains by weight on a dry basis 22 to 28% of calcium carbonate, 1.5 to 3% of calcium fluoride, 7 to 14% of titanium dioxide, 35 to 55% of iron, and 5 to 25% of at least one element selected from the group consisting of chromium, manganese, silicon, nickel and molybdenum. The ratio of the coated welding rod diameter to the core wire diameter is between 1.45:1 and 1.70:1. Preferably the ratio of calcium carbonate to calcium fluoride in the coating is between 10:1 and 20:1. Advantageously, at least 35% of the iron in the coating is iron powder.

3 Claims, No Drawings

COATED WELDING ELECTRODE OF BASIC TYPE SUITABLE FOR VERTICAL DOWN WELDING OF PIPES

This invention relates to a coated welding electrode in which the non-metallic constituents of the coating include calcium carbonate and calcium fluoride, such an electrode being particularly suitable for welding pipe ends which are in a fixed position relative to each other.

The importance of pipe lines as transportation systems for all kinds of materials is increasing steadily. There is an increasing use of high tensile steel pipes for this purpose. Consequently ever higher requirements are imposed on the welded joints and on the reliability of the welding process and on the properties of the weld metal deposited during the welding process.

Long-distance pipe lines are at present welded for the major part with so-called cellulosic electrodes, i.e. electrodes the non-metallic constituents of whose coating include inter alia a high percentage of organic constituents.

The so-called cellulosic electrodes are used in the downhand or downhill welding technique, which guarantees a high deposition rate when making the welded joints.

Known cellulosic welding electrodes however have a relatively high moisture content in the coating, and proce welded joints having a relatively high hydrogen content. This disadvantage may result in brittleness and increases the risk of cracks in the joint. This drawback becomes increasingly important when pipe steels of a high tensile strength are used.

Welding electrodes having a basic coating with a relatively low water content produce welded joints in which the deposited weld metal contains little hydrogen and is purer than in a joint made using the so-called cellulosic welding electrodes. Because of this difference, welding electrodes with a basic coating would be more suitable to satisfy the ever-increasing quality requirements referred to above.

The coating of the basic electrode consists mainly of a mixture of an alkaline earth carbonate and an alkaline earth fluoride and usually comprises only a small amount of silicates. For several reasons, the known basic coated welding electrodes are not suitable for downhand welding of fixed pipe joints; it is, for example, generally not possible to obtain a high grade welded joint. When these welding electrodes are used in upward welding, it is not possible to realise the speed, when making welded joints, which is required for the fabrication of pipe lines, as a relatively low current intensity must be used in upward welding.

It is an object of the present invention to provide a basic coated welding electrode or rod which can be used for downhand welding of fixed pipe joints.

According to the invention, this object is accomplished by means of a welding electrode whose coating, calculated with respect to the dry weight thereof, contains 22 to 28% by weight of calcium carbonate, 1.5 to 3% by weight of calcium fluoride, 7 to 14% by weight of titanium dioxide, 35 to 55% by weight of iron, 5 to 5 to 25% by weight of one or more elements from the group formed by silicon, molybdenum, chromium, manganese and nickel, the diameter ratio of the coated welding rod to the core wire having between 1.45 and 1.70. In addition, the coating contains the conventional binder and pressing agents, for example 3 to 5% by weight of water-glass and 1 to 4% by weight of pressing agents. The pressing agents are added in the form of, for example, alginates and/or bentonite.

It appears that a welding electrode according to the invention behaves in an unusual manner during welding. When welding with known basic coated electrodes, the material transfer in the form of drops is usually irregular, so that the striking point of the arc on the workpiece and on the core of the welding electrode may considerably vary in position, so that in fixed pipe joints good welds can only be obtained by upward welding. For the welding electrodes according to the invention it is found that the cup formed at the welding electrode during welding produces, because of its special concave shape, a regular transfer and a stable, concentrated arc. This makes it possible to downhand weld fixed pipe joints with electrodes according to the invention.

The welding electrode according to the invention may be produced in the usual manner, a coating being provided by means of extrusion around an iron-base core wire, for example made of a low-alloy steel. In addition to calcium carbonate in a quality of 22.0 to 28% by weight, the cladding material contains a quantity of 1.5 to 3% by weight of calcium fluoride, calculated with respect to the dry weight. The ratio between the quantity of calcium carbonate and calcium fluoride is preferably between 10 and 20.

In addition to iron in the form of, preferably, at least 35% by weight of iron powder, the coating preferably contains also iron alloys, such as ferro-manganese, ferro-silicon, ferro-chromium, and ferro-molybdenum and/or manganese metal and/or nickel metal. These additions have the purpose of making a welding material of the desired composition and properties and/or act as reducing agents during welding.

With the coating compositions according to the invention, welding-rods can be manufactured which are suitable for welding steel having a tensile strength in accordance with API of X50 to X100.

The welding electrodes according to the invention can be made in the customary manner by extruding a coating composition around a core wire (2.5–5 mm) made from unalloyed steel.

The electrodes are dried in an oven after extrusion.

The results set forth in Table 1 for downhand welding were obtained with welding electrodes (diameter of core wire 4 mm) according to the invention.

Welding was done with a current intensity of 200 A of direct current and an arc voltage of 20 V. the open-circuit voltage of the converter was 70 V.

TABLE 1

| Electrode type | Tensile strength (N/mm$^2$) | Yield 0,2 Strength (N/mm$^2$) | Elongation 1 = 5d (%) | Contraction on rupture (%) | Impact values V-notch 8 × 10 mm −51° C. (J) (average of 5 measurements) |
|---|---|---|---|---|---|
| 1 | 591 | 502 | 23,0 | 72 | 87 |
| 2 | 650 | 549 | 22,0 | 68 | 61 |
| 3 | 672 | 592 | 21,8 | 66 | 59 |

TABLE 1-continued

| Electrode type | Tensile strength (N/mm²) | Yield 0,2 Strength (N/mm²) | Elongation l = 5d (%) | Contraction on rupture (%) | Impact values V-notch 8 × 10 mm −51° C. (J) (average of 5 measurements) |
| --- | --- | --- | --- | --- | --- |
| 4 | 725 | 680 | 21,0 | 64 | 59 |
| 5 | 807 | 762 | 19,8 | 63 | 58 |

The Table shows that the said coated welding electrodes are suitable for welding steels of A.P.I. classification X50 to X100, inclusive.

Table 2 shows the chemical analysis of the electrode coatings 1-5 of Table 1 expressed in percent by weight.

TABLE 2

| Electrode type | Ca as CaO | Ti as $TiO_2$ | Si as $SiO_2$ | F | Na as $Na_2O$ | Fe | Mn | Ni | Mo | C as $CO_2$ |
| --- | --- | --- | --- | --- | --- | --- | --- | --- | --- | --- |
| 1 | 15.4 | 8.5 | 12.05 | 0.8 | 0.95 | 47.7 | 2.1 | — | — | 11.9 |
| 2 | 15.4 | 11.9 | 10.85 | 0.8 | 1.05 | 43.9 | 3.4 | 2.1 | 1.2 | 11.9 |
| 3 | 15.3 | 11.9 | 10.75 | 0.8 | 1.05 | 43.5 | 2.5 | 4.25 | 0.6 | 11.8 |
| 4 | 14.8 | 11.4 | 10.3 | 0.8 | 1 | 43.1 | 4.1 | 5.3 | 1.15 | 11.4 |
| 5 | 14.7 | 11.3 | 10.05 | 0.8 | 1 | 41.6 | 4.8 | 5.25 | 1.15 | 11.2 |

During the preparation of the coating material the Ca was added in the form of $CaCO_3$ and $CaF_2$, the titanium in the form of rutile, the Si in the form of an iron-silicon alloy (45 wt % Si rest Fe).

What is claimed is:

1. A welding rod comprising a core wire having a coating; said coating containing by weight on a dry basis 22 to 28% of calcium carbonate, 1.5 to 3% calcium fluoride, 7 to 14% of titanium dioxide, 35 to 55% of iron, and 5 to 25% of at least one element selected from the group consisting of chromium, manganese, silicon, nickel and molybdenum; the ratio of the diameter of the coated welding rod to the diameter of the core wire being between 1.45:1 and 1.70:1.

2. A welding rod according to claim 1, in which the ratio of calcium carbonate to calcium fluoride in the coating is between 10:1 and 20:1.

3. A welding rod according to claim 1 or 2, in which at least 35% of the iron in the coating is iron powder.

* * * * *

UNITED STATES PATENT AND TRADEMARK OFFICE
CERTIFICATE OF CORRECTION

PATENT NO. : 4,349,721

DATED : September 14, 1982

INVENTOR(S) : HENRICUS MENTINK ET AL

It is certified that error appears in the above—identified patent and that said Letters Patent is hereby corrected as shown below:

Column 4, Line 30, Delete "iron in the"

Signed and Sealed this

Twenty-sixth Day of July 1983.

[SEAL]

Attest:

GERALD J. MOSSINGHOFF

Attesting Officer

Commissioner of Patents and Trademarks